United States Patent [19]

Arita

[11] 4,048,643
[45] Sept. 13, 1977

[54] EXPOSURE COMPUTATION SYSTEM

[75] Inventor: Isao Arita, Tokyo, Japan

[73] Assignee: Tokyo Shibaura Electric Co., Ltd., Japan

[21] Appl. No.: 641,379

[22] Filed: Dec. 16, 1975

[51] Int. Cl.² ............................................. G03B 7/08
[52] U.S. Cl. .................................... 354/51; 354/37; 354/38; 354/41; 354/43; 354/60 R; 354/60 A
[58] Field of Search ................... 354/23 R, 23 D, 50, 354/51, 60 R, 60 A, 37, 38, 41, 43, 44, 49

[56] References Cited

U.S. PATENT DOCUMENTS

| | | | |
|---|---|---|---|
| 3,712,191 | 1/1973 | Nobusawa | 354/60 A |
| 3,827,060 | 7/1974 | Nobusawa | 354/51 |
| 3,829,866 | 8/1974 | Nobusawa | 354/60 A |
| 3,882,510 | 5/1975 | Nobusawa | 354/60 A |

Primary Examiner—Russell E. Adams
Attorney, Agent, or Firm—Oblon, Fisher, Spivak, McClelland & Maier

[57] ABSTRACT

A diaphragm aperture value which has been set is transformed into corresponding frequency information. A local oscillator starts sweeping upon pushing of the shutter button. The output of the local oscillator and the frequency information are inputted to a mixer, and the output of the mixer is fed to a filter circuit, whose center frequency is variable according to the luminance information of an object to be photographed. Only a specific output frequency of the mixer passes through the filter circuit, and the output of the filter circuit generates a control signal which closes the shutter at a suitable diaphragm aperture time.

15 Claims, 6 Drawing Figures

EXPOSURE COMPUTATION SYSTEM

BACKGROUND OF THE INVENTION

1. Field of the Invention

The present invention relates to an exposure computation system wherein a computation is carried out with frequency information which corresponds to the exposure factors.

2. Description of the Prior Art

Generally, in an auto exposure computation system, the light information of the object to be photographed is transformed into a current or voltage value and is condensed logarithmically in order to enable electrical computation.

An ASA value and a diaphragm value are applied to an operation circuit, and the output of this operation circuit and a threshold voltage generating circuit are applied to a comparator circuit to compare them. When a coincidence occurs, the comparator circuit generates a signal which drives a driver circuit, such as a magnetic driver.

However, in conventional systems of this type wherein the threshold voltage generating circuit is used, it is difficult to change over the shutter speed presetting system and the diaphragm aperture presetting system. Additionally, the computation circuit is complicated and accordingly, the application of electronics to the camera is deemed insufficient.

BRIEF SUMMARY OF THE INVENTION

It is therefore an object of the present invention to provide an exposure computation system in which the exposure factors, such as shutter speed value, diaphragm value and the like can be computed as frequency values.

It is a further object of the present invention to provide an exposure computation system which can easily change over the shutter speed presetting system and the diaphragm aperture presetting system.

One further object of the present invention is to provide an exposure computation system which can be manufactured at low cost.

Yet one further other object of the present invention is to provide an exposure computation system whose system composition is simple and whose operation is accurate.

Briefly, in accordance with the present invention, the foregoing and other objects are attained by the provision of an exposure computation system which includes converting means for transforming exposure factors, such as the shutter speed value and the exposure aperture value into frequency information, a mixer, a local oscillator and a filter circuit. Only a specific output frequency of the mixer passes through the filter circuit, and the center frequency of the filter circuit is variable according to the luminance information of an object to be photographed. The output of the filter circuit generates a control signal which drives a driver circuit such as a magnetic driver.

BRIEF DESCRIPTION OF THE DRAWINGS

The invention is illustrated by way of example in the accompanying drawings which form part of this application and in which.

DETAILED DESCRIPTION OF THE PREFERRED EMBODIMENT

Figure 1:
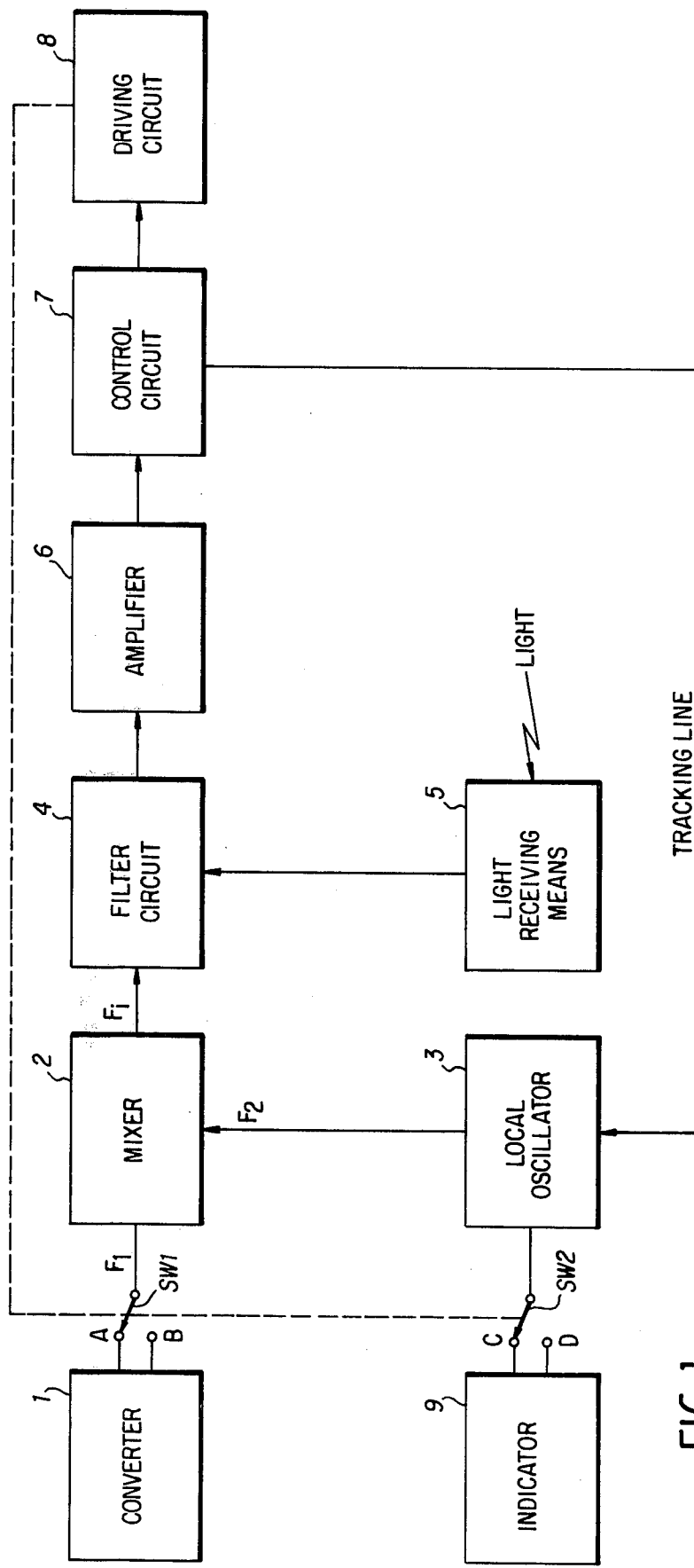
FIG. 1 shows a block diagram of a preferred embodiment of the present invention.

Referring now to the drawings wherein like reference numerals refer to identical or corresponding parts throughout the specification and more particularly to FIG. 1 thereof wherein the principle of operation of the exposure computing system according to the present invention is illustrated.

The system illustrated in FIG. 1 includes a converter 1 which transforms a shutter speed value and an exposure aperture value into a frequency value proportional thereto. In the case of the diaphragm presetting system, the diaphragm value is transformed into a frequency value $F_1$ by the converter means 1. It should be understood that the diaphragm value is set by a diaphragm dial which is mechanically connected to a variable register (not shown). Variations of the variable register are transformed into voltage values, which correspond to the diaphragm values. These voltage values are converted to frequency values by a multivibrator or V.C.O. (Voltage Controlled Oscillator). The frequency information $F_1$ is applied to one of the terminals of a mixer 2 by connecting a switch $SW_1$ to the terminal A. The switch $SW_1$ is used to change over from the diaphragm presetting system to the shutter speed presetting system. A local oscillator 3 is provided and begins sweeping upon the pushing of a shutter button. The oscillator frequency $F_2$ of the local oscillator 3 increases in proportion to time, and is applied to another terminal of the mixer 2. In the mixer 2, an operation such as subtraction of the two inputs, namely, the frequency information $F_1$ and the oscillator signal $F_2$, is carried out. The output frequency $F_i$ of the mixer 2, $F_i = |F_1 - F_2|$, is applied to a filter circuit 4, whose center frequency $F_O$ is variable according to the output voltage value of a light receiving means 5, which receives the luminance information of an object to be photographed. The filter circuit 4 is connected to a control circuit 7 through an amplifier circuit 6. The control circuit 7 generates a control signal which controls a driving circuit 8, which drives the shutter (or the diaphragm). The driving of the shutter or the diaphragm by the driving circuit 8 is changed over by a switch in cooperation with the switch $SW_1$. Furthermore the control circuit 7 generates a tracking signal, which controls the local oscillator 3 to track a most suitable local oscillator frequency $F_2$ for a fixed input information $F_1$. In particular, the sweeping of the local oscillator 3 is stopped by the tracking signal. The local oscillator 3 is connected to an indicator 9 through a switch $SW_2$ in cooperation with the switch $SW_1$. The indicator 9 displays the suitable shutter speed value (diaphragm value) in a finder of the camera.

The exposure computation of the shutter speed presetting system is carried out similarly by changing over the switch $SW_1$ to the terminal B.

Figure 2:
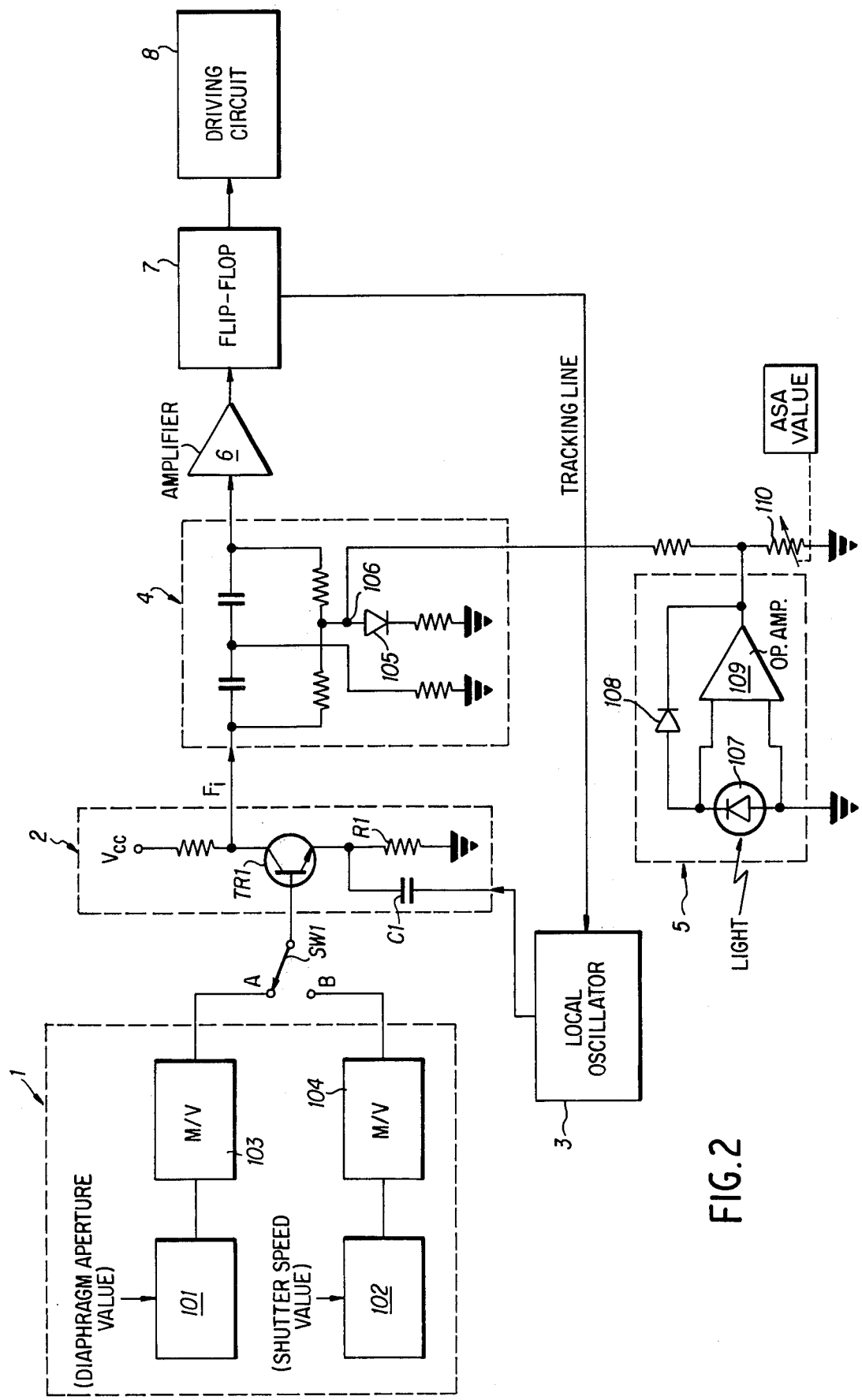
FIG. 2 shows a detailed diagram of the exposure computation circuit shown in FIG. 1.
Figure 3:
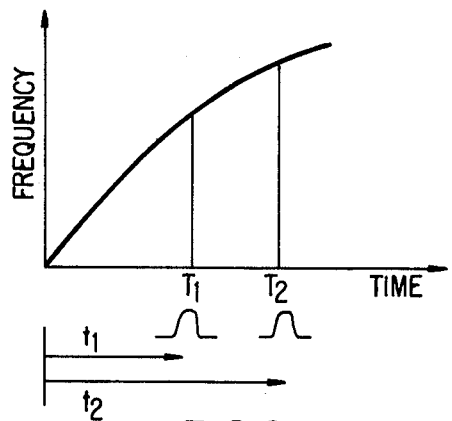
FIG. 3 shows a graph of the relationship between the frequency of the local oscillator in the circuit of FIG. 2 and time.
Figure 4:
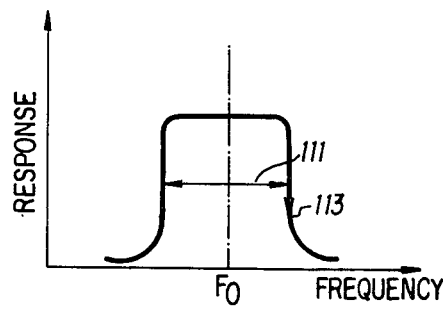
FIG. 4 shows a graph of the relationship between the response of the filter circuit in the circuit FIG. 2 and the oscillator sweep frequency about the center thereof.

Referring now to FIG. 2, there is illustrated therein in more detail an example of the circuitry of the computing circuit according to the present invention as illustrated in FIG. 1. In the converter 1, a diaphragm aperture value and a shutter speed value are respectively transformed into a corresponding voltage value by a variable register 101 and 102. The voltage values are then converted to frequency values by a respective multivibrator or V.C.O. (voltage controlled oscillator) 103 and 104. In understanding the following it should be understood that a luminance range of $1/1000 \sim 1000$ Lux may correspond to the frequency range (1 kHz $\sim$ 100 MHz). The diaphragm aperture information and the shutter speed information are transformed into the frequency value and are each outputted respectively to terminal A and terminal B. When switch $SW_1$ is connected to terminal A (diaphragm presetting system), the diaphragm information is transformed into the frequency value $F_1$ and is applied to the mixer 2. In this embodiment the mixer 2 includes a transistor $TR_1$, a capacitor $C_1$ and a resistor $R_1$. The diaphragm information $F_1$ is applied to the base of the transistor $TR_1$. The local oscillator 3 is connected to the emitter of the transistor $TR_1$ through the capacitor $C_1$ and oscillates as shown in FIG. 3. In the mixer 2, a subtraction operation of the two inputs, the diaphragm information $F_1$ and the oscillator frequency $F_2$, is carried out, and the output ($F_i = |F_1 - F_2|$) of the mixer 2 is applied to the filter circuit 4. In this embodiment, a twin T circuit may be used as the filter circuit. A variable capacitor diode or varactor 105 is provided in the filter circuit 4 and the capacitance thereof is variable according to the applied voltage value. The filter circuit 4 has characteristics as shown in FIG. 4. The center frequency $F_O$ of the filter circuit 4 is variable according to the voltage value at terminal 106. Thus, in the twin T circuit, which includes resistors, capacitors and a variable capacitor diode, the center frequency can be changed by variation of the capacitor component value and the resistor component value of the diode 105. The light receiving means 5 is connected to the terminal 106. The light receiving means 5 includes a light receiving element 107, a logarithmic diode 108 and a computation operational amplifier 109. In the light receiving means 5, the input light is converted logarithmically to a voltage value by means of the photoelectric effect. A variable resistor 110 is provided for selecting an input ASA value. The output of the filter circuit 4 is applied to a control circuit 7 through an amplifier circuit 6. The control circuit 7 is constructed of a flip flop circuit which generates a control signal, in response to the output pulse of the filter circuit 4, at the down pulse 113 time as shown in FIG. 4. The control signal further controls the driving circuit 8, such as a magnetic driver, and closes the shutter at a suitable exposure time. If, for example, the exposure factors are the following values, (1) the center frequency $F_O$ of the filter circuit 4: 1 MHz (2) the bandwidth of the filter circuit 111: 100 kHz (3) the diaphragm frequency $F_1$: 1.5 MHz (diaphragm value $F = 5.6$), then the frequency $F_2$ of the local oscillator 3 is 0.5 MHz (corresponding to time $T_1$ in FIG. 3). If the diaphragm frequency $F_1$ is 1.6 MHz (diaphragm value $F = 8$) and the other values are the same as above, then the frequency $F_2$ of the local oscillator is 0.6 MHz (corresponding to time $T_2$ in FIG. 3). The time information $T_1$ and $T_2$ therefore corresponds to the shutter speed value. Moreover the control circuit 7 generates a tracking signal, which stops the sweep of the local oscillator 3.

In this manner, the auto exposure computing is completed, and the photographing is carried out in the condition of a suitable shutter speed value.

The exposure computation of the shutter speed presetting system is carried out similarly by changing over the switch $SW_1$ to the switch $SW_2$.

Figure 5:
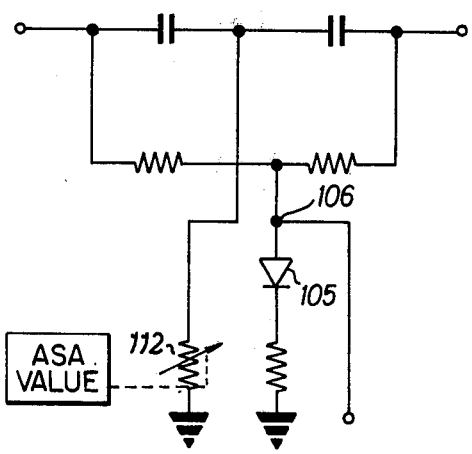
FIG. 5 shows a modified form of the filter circuit in FIG. 2.
Figure 6:
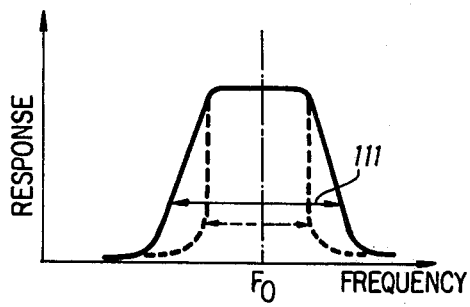
FIG. 6 shows a graph of the relationship between the response of the filter circuit in FIG. 5 and the oscillator sweep frequency about the center thereof.

Referring now to FIG. 5, a modified filter circuit for use in FIGS. 1 and 2 is illustrated. The filter circuit illustrated in FIG. 5 includes a variable resistor 112 for setting an input ASA value. The filter characteristics, such as sharpness and bandwidth of the filter circuit, are changed by the variable resistor 112. The magnitude of the bandwidth 111 of the filter circuit which is shown in FIG. 6 is selected in accordance with the shutter speed time.

It should now be apparent, as explained above, that the exposure computation system according to the present invention is improved in such a manner that the computation is carried out using frequency information of all of the exposure factors. Accordingly, it is possible to easily change over the shutter speed presetting system and the diaphragm aperture presetting system. Moreover, the composition of the system is simple, and the operation thereof accurate.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An exposure computation system comprising:
   converting means for transforming diaphragm information into a frequency value,
   a mixer having two terminals, one of which is connected to said converting means,
   a local oscillator for providing a sweep signal, and which is connected to the other terminal of said mixer,
   a filter circuit having two input terminals, one of which is connected to said mixer, and whose center frequency is variable according to object luminance information,
   an object luminance information receiving means connected to one of said input terminals of the filter circuit, for generating a voltage value proportional to the logarithm of a light intensity to said receiving means, and
   a shutter time control circuit to control an opening time of a shutter based on the output of the said filter circuit.

2. An exposure computation system as in claim 1 wherein the control circuit is connected to the local oscillator by a tracking line to track the sweep of the local oscillator.

3. An exposure computation system as in claim 1 wherein the converting means is a multivibrator.

4. An exposure computation system as in claim 1 wherein the filter circuit is a twin T filter circuit including a variable capacitor diode.

5. An exposure computation system as in claim 1 wherein the twin T filter circuit includes a variable resistor for changing the characteristics of the filter circuit.

6. An exposure computation system as in claim 5 wherein the bandwidth of the filter circuit corresponds to a selected ASA value.

7. An exposure computation system comprising:
converting means for transforming shutter speed information into a frequency value,
a mixer having two input terminals, one of which is connected to said converting means,
a local oscillator for providing a sweep signal and which is connected to the other terminal of said mixer,
a filter circuit having two input terminals, one of which is connected to said mixer, and whose center frequency is variable according to object luminance information,
an object luminance information receiving means connected to one of said input terminals of the filter circuit, for generating a voltage value proportional to the logarithm of light intensity to said receiving means, and
a diaphragm control circuit to control the diaphragm aperture based on the output of said filter circuit.

8. An exposure computation system as in claim 7 wherein the control circuit is connected to the local oscillator by a tracking line to track the sweep of the local oscillator.

9. An exposure computation system as in claim 7 wherein converting means is a voltage controlled oscillator.

10. An exposure computation system as in claim 7 wherein a light receiving means generates a voltage value proportional to the logarithmic value of an object brightness, and ASA value inputting means is connected to the output of the light receiving means.

11. An exposure computation system as in claim 7 wherein the filter circuit is a twin T filter circuit and includes a variable resistor to change the characteristics of the filter circuit.

12. An exposure computation system as in claim 11 wherein variation of the bandwidth of the filter circuit corresponds to ASA values.

13. An exposure computation system comprising:
shutter speed information inputting means for inputting a frequency value proportional to the shutter speed,
diaphragm information inputting means for inputting a frequency value proportional to the diaphragm value,
selective changeover means connected to said shutter speed information inputting means and said diaphragm information inputting means,
a mixer having two terminals, one of which is connected to said selective changeover means,
a local oscillator for providing a sweep signal and which is connected to the other terminal of said mixer,
a filter circuit having two input terminals, one of which is connected to said mixer, and whose center frequency is variable according to object luminance information,
an object luminance information receiving means connected to one of said input terminals of the filter circuit, for generating a voltage value proportional to the logarithm of a light intensity to said receiving means, and
a control circuit to control a driving circuit which selectively drives the shutter or the diaphragm through a switch means which operates in cooperation with said selective changeover means.

14. An exposure computation system as in claim 1, further comprising:
a variable resistor connected to both said filter circuit and said object luminance information receiving means for inputting an ASA value.

15. An exposure computation system as in claim 7, further comprising:
a variable resistor connected to both said filter circuit and said object luminance information receiving means for inputting as an ASA value.

* * * * *